US010198753B2

United States Patent
Niepert et al.

(10) Patent No.: US 10,198,753 B2
(45) Date of Patent: Feb. 5, 2019

(54) PRIVACY-AWARE IN-NETWORK PERSONALIZATION SYSTEM

(71) Applicant: NEC Europe Ltd., Heidelberg (DE)

(72) Inventors: Mathias Niepert, Heidelberg (DE); Lili Jiang, Umea (SE); Mohamed Ahmed, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 245 days.

(21) Appl. No.: 15/157,511

(22) Filed: May 18, 2016

(65) Prior Publication Data

US 2017/0337587 A1    Nov. 23, 2017

(51) Int. Cl.
*G06Q 30/02* (2012.01)
*H04L 29/08* (2006.01)
*G06Q 10/06* (2012.01)
*G06N 3/04* (2006.01)

(52) U.S. Cl.
CPC ....... *G06Q 30/0271* (2013.01); *G06Q 10/067* (2013.01); *H04L 67/02* (2013.01); *G06N 3/0454* (2013.01)

(58) Field of Classification Search
CPC .................................................. G06Q 30/0271
See application file for complete search history.

(56) References Cited

U.S. PATENT DOCUMENTS

| | | | |
|---|---|---|---|
| 6,996,536 B1 * | 2/2006 | Cofino | G06Q 30/06 705/26.8 |
| 8,521,892 B2 | 9/2013 | Van Riel | |
| 2006/0053095 A1 * | 3/2006 | Koch | G06F 17/30864 |
| 2006/0064411 A1 * | 3/2006 | Gross | G06F 17/30864 |
| 2008/0086558 A1 * | 4/2008 | Bahadori | G06F 11/3438 709/224 |
| 2010/0082435 A1 | 4/2010 | Hartman | |
| 2010/0114654 A1 * | 5/2010 | Lukose | G06Q 30/00 705/14.54 |

OTHER PUBLICATIONS

Rumelhart et al., Learning representations by back-propagating errors, 1986, Nature Publishing Group, all pages.*
Mikolov et al., Efficient Estimation of Word Representations in Vector Space, 2013, all pages.*

(Continued)

*Primary Examiner* — Jacob C. Coppola
(74) *Attorney, Agent, or Firm* — Leydig, Voit & Mayer, Ltd.

(57) ABSTRACT

A personalization system includes a preprocessing component configured to receive a request from a user over a communications network and generate a request key using predefined attributes of the request. A categorization component is configured to map the request key to a subset of domain-dependent vocabulary. An augmentation and buffer component is configured to augment the request with the subset of domain-dependent vocabulary mapped to the request key by the categorization component and to buffer request sequences in queues according to sequence identifiers. An embedding model component is configured to update an embedding model using the buffered request sequences. A personalization component is configured to provide a personalization using the updated embedding model.

15 Claims, 3 Drawing Sheets

(56) References Cited

OTHER PUBLICATIONS

Vincent Toubiana, et al. "Adnostic: Privacy Preserving Targeted Advertising", Conference: Proceedings of the Network and Distributed System Security Symposium, NDSS 2010, San Diego, California, USA, Feb. 28-Mar. 3, 2010, pp. 1-23.

Przemyslaw Kazienko, et al., "AdROSA-Adaptive personalization of web advertising", Information Sciences, vol. 177, issue 11, Jun. 1, 2007, pp. 2269-2295.

Jeffrey Heer, et al., "Separating the swarm: categorization methods for user sessions on the web", Proceeding, CHI '02 Proceedings of the SIGCHI Conference on Human Factors in Computing Systems, Dec. 2002, pp. 243-250.

David E. Rumelhart, et al., ,,Learning representations by back-propagating errors, Nature 323, Oct. 9, 1986, pp. 533-536.

Tomas Mikolov, et al., "Efficient Estimation of Word Representations in Vector Space", retrieved from URL: https://arvix.org/abs/1301.3781, Sep. 7, 2013, pp. 1-12.

Tomas Mokolov, et al., "Distributed Representations of Words and Phrases and their Compositionality", retrieved from URL: https://arvix.org/abs/1310.4546, Oct. 16, 2013, pp. 1-9.

\* cited by examiner

PRIVACY-AWARE IN-NETWORK PERSONALIZATION SYSTEM

FIELD

The present invention relates to a personalization system integrated within a working communication network infrastructure which preserves privacy of its users. The system can adapt the behavior of the network based on user activity.

BACKGROUND

The service and content personalization economy is growing at a staggering pace. Global total internet advertising revenue alone is forecast to grow from USD 135.42 bn in 2014 to USD 239.87 bn in 2019, with an annual growth rate of 12.1% over that period. It is projected to exceed TV advertisement to become the largest single advertising category by the year 2019. Even though network operators provide the infrastructure on which the companies in the personalization domain run their business, most operators are not attempting to partake in this business model.

The earliest work relating to the present invention includes personalized search and recommendation systems. In order to tailor search results to different users, search engine companies, such as GOOGLE and YANDEX, used their search logs containing user browsing behavior to predict the interests of the different users. Similarly, electronic commerce enterprises, such as AMAZON, used shopping histories of different consumers to infer interests of the different consumers for further recommendation. Typically, both personalized search and recommendation systems such as these require specific user input (e.g., user profile and shopping history for product recommendation, browsing/search history for personalization search).

Various publications describe work relating to categorization and on-line advertising. Toubiana, et al., "Adnostic: Privacy Preserving Targeted Advertising," NDSS 2010 describe a tool that is designed for personalized web advertising with the concern of privacy preservation. The domain-related categorization of Adnostic simply depends on the cosine similarity between Google Ads Preferences categories, names and tags of the concerned web page. The focus of Adnostic is privacy preservation through exploring user profiles/interests and then reporting which ad was viewed without revealing this to the broker. Similarly, with the concern of privacy, Kazienko, et al., "AdROSA-adaptive personalization of web advertising," Information Sciences, 177(11):2269-2295, 2007 address the problem of web banner advertisements personalization with respect to user privacy wherein none of the user's personal information are stored locally. It is based on extracting knowledge from the web page content and historical user sessions as well as the current behavior of the on-line user, using data-mining techniques. Heer, et al., "Separating the swarm; categorization methods for user sessions on the web," CHI 2002 propose a categorization method using a clustering algorithm which aims to increase processing efficiency by simply using the features of user view and visit paths without considering web page content. While this could improve the efficiency to some extent, it certainly would lead to information loss.

U.S. Patent Application Publication No. 2010/0082435 describes a customizable ad marker and U.S. Pat. No. 8,521,892 describes a method and apparatus for controlling web page advertisement through incentives and restrictions. The systems described here only consider requests for one particular webpage (URL) and do not learn a machine learning embedding model based on request traces. Further, the systems do not have any capabilities for querying a embedding model learned from fixed-size sequences of request. Moreover, the systems are focused solely on advertisements of a single user, whereas, in contrast, embodiments of the present invention focus on service personalization based on request histories by several users. In further contrast, embodiments of the present invention also apply to various types of network traffic and are not restricted to only webpage request traffic, or in other words, HTTP traffic as specified in the prior art systems.

In sum, none of the existing approaches have addressed the problem by a comprehensive in-network system based on learning privacy-protecting embedding models from request sequences.

SUMMARY

In an embodiment, the present invention provides a privacy-aware in-network personalization system. A preprocessing component is configured to receive a request from a user over a communications network and generate a request key using predefined attributes of the request. A categorization component is configured to map the request key to a subset of domain-dependent vocabulary. An augmentation and buffer component is configured to augment the request with the subset of domain-dependent vocabulary mapped to the request key by the categorization component and to buffer request sequences in queues according to sequence identifiers. An embedding model component is configured to update an embedding model using the buffered request sequences. A personalization component is configured to provide a personalization using the updated embedding model.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
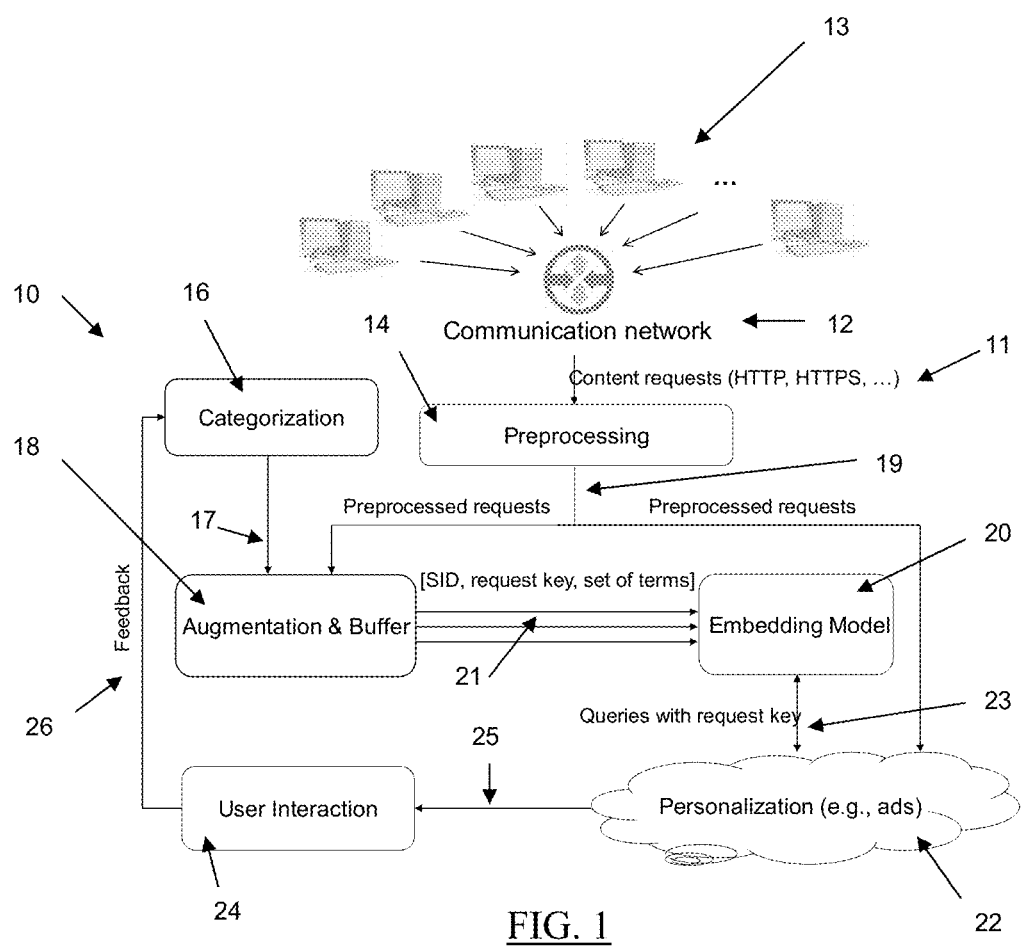
FIG. 1 is a schematic view of an exemplary system architecture of a personalization system according to an embodiment of the invention.

The inventors have recognized a number of reasons why network operators have not been involved in the personalization domain. The main challenge is a lack of technological solutions that are (a) efficient for the network setting, (b) effective for personalization problems and (c) sufficiently privacy-preserving. Such technology for efficient and effective network data monetization would allow network operators to partake in a growing multi-billion dollar economy.

In an embodiment, the present invention addresses this problem by providing a privacy-preserving in-network personalization system. The system addresses several technological challenges. First, it provides a comprehensive system that can be integrated into a working communication network infrastructure and changes the network's behavior based on user activity. For instance, the network speed can be adapted to users; different content can be cached; different advertisements can be displayed to users, etc. Second, the system is highly efficient. The personalization is performed by mapping the network users to their interests via an embedding model that learns which requests indicate which interest.

The learning of the embedding model permits personalizations to be carried out faster and more accurately than was heretofore possible while at the same time using less computational resources to so. The mapping of users to interests can be performed in constant time. Third, the system is privacy-aware. Even though the embedding model at the core of the system is learned using request sequences associated with users, the learned model does not reveal personal information about the users in the network. The model can also be used to overcome the sparsity and effectiveness problem. By learning which requests are associated with which interests using billions of past request sequences, it is possible to provide a higher quality personalization experience while using less memory and processing power compared to the state of the art systems.

In one embodiment, the input of the privacy-aware in-network personalization system consists of sequences of content requests, such as HTTP and HTTPS requests. The output is a mapping from users to personalized network services and/or personalized content (such as advertisements) where the mapping is computed in real-time. The mapping is maintained in a machine learning model that is privacy-aware, that is, leakage of the model preserves the privacy of the end users of the network for which personalization is provided. The requests themselves are never stored in the system. The advantages of the proposed system are efficiency and privacy-awareness. The system can personalize the in-network user experience using constant-time look ups. Moreover, the system never stores a mapping between user identifiers (such as IPs, etc.) and their interests.

In contrast, to the state of the art discussed above, an embodiment of the present invention maintains a privacy-aware machine learning model for user-defined request key and sequence identifiers. The model can be used for personalization problem such as targeted advertisement, content personalization, and service personalization. State of the art systems are not privacy-aware, do not use an embedding method, and do not work for request types other than HTTP. Embodiments of the system in the present invention are highly efficient and effective at computing the mapping from requests to domain-dependent vocabulary terms. The methods used by the system achieves a high accuracy while remaining tractable in a high-speed communication network setting.

FIG. 1 depicts an overall framework of the proposed in-network personalization system 10, which infers the users' domain-related interests based on network requests 11, such as HTTP and HTTPS requests. The system 10 is situated in a communication network 12, connected to a plurality of computers, tablets smartphones and other internet-capable user devices 13. The system 10 has six main components: Preprocessing 14, Categorization 16, Augmentation and Buffer 18, Embedding Model 20, Personalization 22, and User Interaction 24.

In the following, each of these system components are described:

Preprocessing: There are two inputs to the Preprocessing component 14: (a) an operator provided set of request attributes which are used to form the request key and (b) the request sequences passing through the core network. The attributes forming a request key are fixed and are taken from the properties of the types of requests. Which of the attributes form a key is application dependent and can be determined by the operator of the system. For example, for HTTP requests 11, a request key could consist of the domain and content type of the HTTP request. A request key value is a particular instantiation of the request key. For the example, this could for instance be [www.rei.com, text/html].

Example 1: HTTP Request

[1425291195, 1425291300, 1035, 202.201.13.20, '28066', text/html, http://m.rei.com, http://www.rei.com/s/mens-jackets-deals?ir=collection%3Amens-jackets-deals&page=1]

The request key is used to identify unique requests. Requests with the same request key are treated as unique in the Embedding Model component 20. Consecutive requests with identical request key values are merged into one single request.

Categorization: The Categorization component 16 has two inputs: (a) the operator provided request key and (b) a fixed domain-dependent vocabulary (an element of which is called a term) describing the domain of interest. For instance, for advertisement personalization, the vocabulary could consist of product-related category and product names (sports, iPhone, shoes, electronics, etc.) and for service personalization in a mobile network the vocabulary might consist of the different types of voice and data plans and add-ons (Flat500 MB, VoiceFlat, StudentPlan, . . . ) of the operator.

The Categorization component 16 maps each of the unique request key values to a subset of the domain-dependent vocabulary. The mapping is either given or can be computed in regular intervals. For instance, for HTTP requests 11, where the request key contains a hostname or URL, a prior crawling of webpages and the computation of an intersection of the webpage text and the domain-dependent vocabulary results in such a mapping. For service personalization in mobile networks, the mapping might be determined based on subscriber information. This mapping is an initial mapping that is refined in the Embedding model component 20.

The mapping of request keys to sets of domain-dependent vocabulary terms is stored in a table so as to facilitate constant-time lookup.

Example 2: Categorization

For HTTP requests and the request key consisting of the URL path and the content type, request key=[URL path, content type], the system uses text in the webpages to map each request key value to a set of domain-dependent terms. Particular content types might also lead to the addition of terms (here: video-affine).
[[request key, subset of vocabulary]]
[[www.rei.com/c/mens-running-shoes/, text/html], {outdoors, sports, running, shoes}]
[[www.thetannery.com/men/, text/html], {male, fashion}]
[[www.rei.com, video/mpeg], {video-affine, outdoors}]
. . .

For several request keys, the set of vocabulary terms might be empty. The Embedding Model component 20 is used to overcome the problem of sparse population of request key values. The Categorization component 16 can be privacy-preserving by not permitting any user-specific data to be stored as part of the component.

Augmentation and Buffer: The Augmentation and Buffer component 18 has two inputs: (a) The mapping from request key values to the set of domain-dependent terms 17 as maintained in the Categorization component 16 and (b) a sequence of incoming preprocessed requests 19 from the Preprocessing component 14. The task of the Augmentation and Buffer component is to augment the requests 19 (identified by the request key value) with the set of vocabulary terms maintained by the Categorization component 16. Moreover, the Augmentation and Buffer component also buffers request sequences which are divided up according to sequence identifiers (SIDs). Sequence identifiers indicate requests that are (with high probability) made by the same individual user. A typical choice for sequence identifiers in communication networks would be the IP address or internal user ids. The downstream Embedding Model component 20 accepts fixed-length sequences of requests, where each such sequence is made by an individual user with high probability. Let the length of the requests be L and an odd integer number. By using the sequence identifiers, the Augmentation and Buffer component 18 divides the original request sequence into request subsequences and buffers these sequences using one queue per sequence identifier. Whenever a queue has reached length L, the queue content is sent to the Embedding Model component 20 as sequences 21 and the oldest element of the queue is removed. The sequences 21 sent to the Embedding Model component 20 are used to update the embedding model.

In an embodiment, the Augmentation and Buffer component 18 has an additional important function. Specifically, it maintains a counter that keeps track, for each request key value, the number of sequence identifiers that have made a request to that request key value. Only when the counter exceeds a user-given integer threshold k>1 (say 5), requests with this request key are augmented and buffered. This ensures two properties of the embedding model. First, it enforces the embedding model to satisfy k-anonymity: the information for each sequence identifier contained in the embedding model cannot be distinguished from at least k−1 sequence identifiers whose information also appears in the release. Second, it enables the exclusion of rare request key values that might introduce noise into the embedding model.

The following example demonstrates a typical input and output of the Augmentation and Buffer component 18.

Example 3

Input and output of the Augmentation and Buffer component 18 with request key comprised of URL path and content type. Here, the SID is the IP address.

Input: (request sequence with request key = [URL path, content type])
...
20.21.13.2 [www.rei.com/c/mens-running-shoes/, text/html]
20.21.14.2 [www.thetannery.com/men/, text/html]
20.21.13.2 [www.rei.com, video/mpeg]
24.22.13.2 [www.adidas.com/us/basketball-shoes/, text/html]
20.21.14.2 [www.thetannery.com/men/, video/mpeg]
24.22.13.2 [www.amazon.com/dp/B00I15SB16/, text/html]

-continued

...
Output:
Buffer 1:
...
20.21.13.2 [[www.rei.com/c/mens-running-shoes/, text/html], {outdoors, sports, running, shoes}]
20.21.13.2 [[www.rei.com, video/mpeg], {video-affine, outdoors}]
20.21.13.2 ...
...
Buffer 2:
...
20.21.14.2 [[www.thetannery.com/men/, text/html], {male, fashion}]
20.21.14.2 [[www.thetannery.com/men/, video/mpeg]], {video-affine, male, fashion}]
20.21.14.2 ...
...
Buffer 3:
...
24.22.13.2 [[www.adidas.com/us/basketball-shoes/, text/html], {sports, basketball, shoes}]
24.22.13.2 [[www.amazon.com/dp/B00I15SB16/, text/html], {electronics, tablet, kindle}]
24.22.13.2 ...
...

Embedding Model: The Embedding Model component 20 maintains and continuously updates a machine learning model that drives the proposed in-network personalization system. It uses the incoming stream of sequences 21 from the Augmentation and Buffer component 18 to update an embedding model. The embedding model is based on shallow neural networks which are mostly trained using stochastic gradient descent (SGD) and back-propagation (see Rumelhart, et al., "Learning internal representations by back-propagating errors," Nature, 323:533.536, 1986) due to the method's efficiency. The embedding model transforms a vector representation of tokens into a lower dimensional dense vector representation. Such embedding models have been applied to natural language processing (NLP) problems (where tokens correspond to words) in different ways as discussed in Mikolav, et al., "Efficient estimation of word representations in vector space," arXiv: 1301.3781, 2013 and Mikolav, et al., "Distributed representations of words and phrases and their compositionality," Advances in neural information processing systems, 2013. However, to date, such models have not been applied to any application in network request sequences.

An embodiment of the proposed request embedding model in the present invention has two distinct sets of tokens: (1) The set of input tokens is the set of request key values visited at least k times (see the description of the Augmentation & Buffer component 18) and (2) the set of output tokens is here the domain-dependent vocabulary (see the description of the Categorization component 16).

In the Embedding Model component 20, the request sequences 21 provided by the Augmentation & Buffer component 18 are used as contexts of the request key value situated at the center of the sequence. Contrary to word embedding models, these contexts contain the center request key value itself. The output of the model is the union of the sets domain-dependent terms associated with the context request key values.

According to an embodiment, the Embedding Model component 20 operates as follows:

The Embedding Model component 20 generates a one hot encoding of the set of all request key values. The dimension D of the vector space encoding is the number of request key values. A request key value is represented by a one hot vector, that is, a vector of length D with all zero entries except an entry of value 1 for the position corresponding to the particular request key value. The component also generates a one hot encoding for the domain-dependent vocabulary terms.

Figure 2:
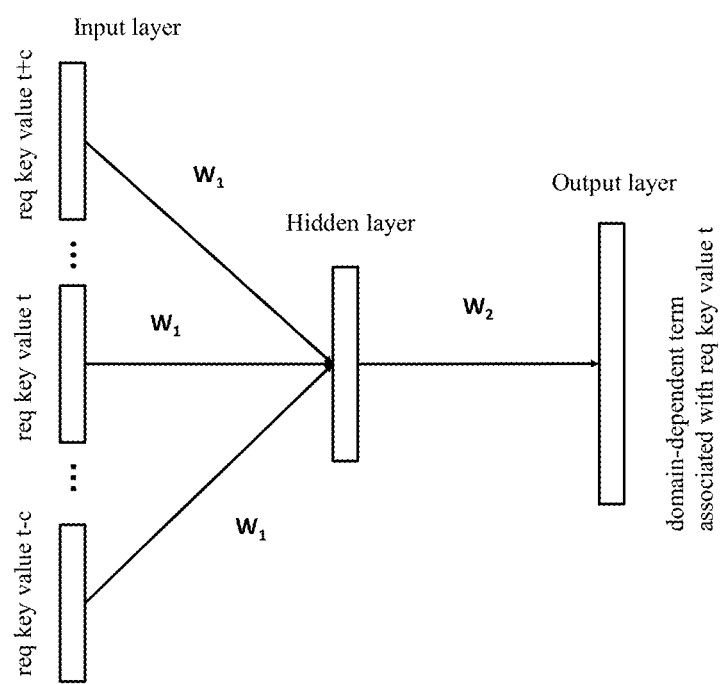
FIG. 2 is a schematic illustration of a request embedding model as a neural network.

The parameter L (see the description of the Augmentation and Buffer component 18) determines the size of the context used in the embedding model, that is, the number of requests before and after the current request that is used as input to the model. The context size c is set to $c=(L-1)/2$ (see FIG. 2).

The output layer (see FIG. 2) corresponds to the one hot encodings of the domain-dependent terms. For each context with center request key rkv, the model is trained to predict the one hot encoding of the domain-dependent terms for rkv.

The weights $W_1$ and $W_2$ (see FIG. 2) are updated using back-propagation and SGD. One can use several loss functions such as the one resulting from Negative Sampling (see Rumelhart, et al., "Learning internal representations by back-propagating errors," Nature, 323:533.536, 1986).

Figure 3:
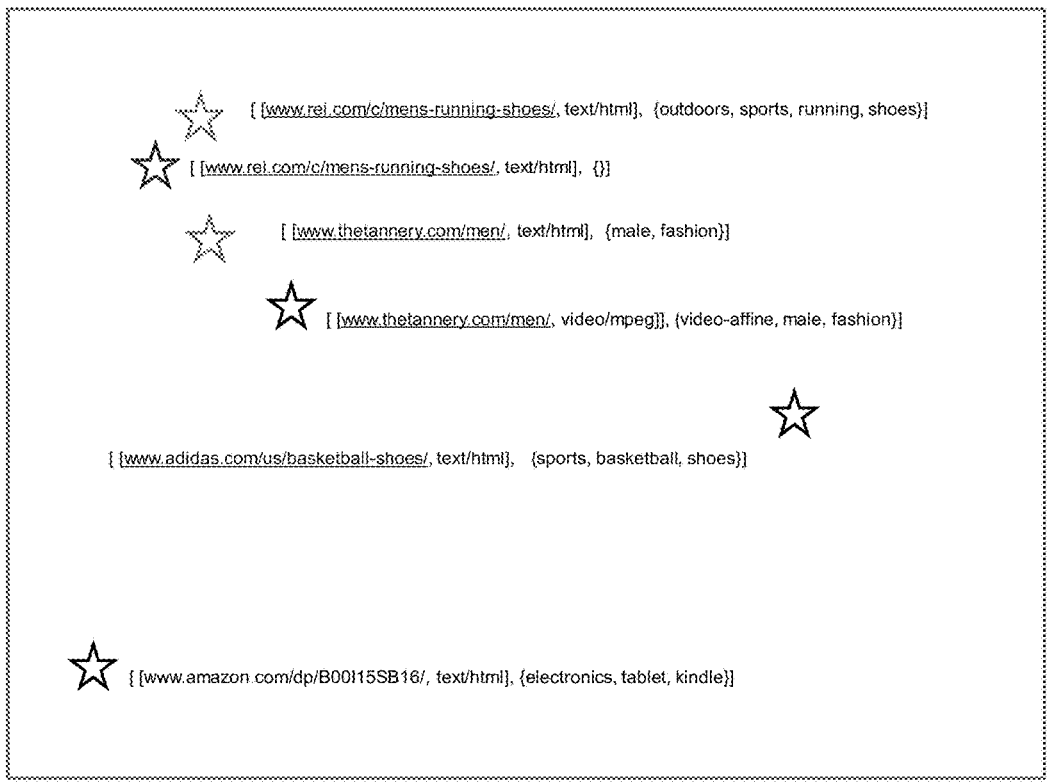
FIG. 3 shows a two-dimensional embedding of example requests.

At each point in time, the embedding model provides an embedding of the request key values. FIG. 3 illustrates a two-dimensional embedding on the example requests. The closer two request key values in the embedding space, the more likely they have been made by individuals with similar personalization needs. For the request key indicated with the (red) star on the second line, the two closest requests are indicated with indented (green) stars above and below it.

Given an arbitrary request key value rkv, the system determines the m nearest neighbors of rkv and takes the union of all sets of domain-dependent terms associated with these neighbors. This can be done with existing efficient m-nearest neighbor algorithms and implementations. A lookup table is updated that stores a mapping from the request key values to the set of domain-dependent terms computed in this way. This table is used by the Personalization component 22 described below.

Personalization: The Personalization component 22 takes incoming requests 23 and performs a look-up in the table that stores the mapping from request key values to subsets of the domain-dependent vocabulary. This look-up is possible in constant time and allows the system to process request sequences at network speed.

User Interaction: The User Interaction component 24 detects how the user reacts to the personalization 25 (e.g., whether the user clicks on a recommended ad or not) and updates the mapping from request key values to domain-dependent vocabulary accordingly. For instance, if after visiting a URL $U_1$ and being presented with Ad $A_1$ the user never clicks on it, the keywords associated with the ad are removed from the set of terms associated with $U_1$ in the Categorization component 16 via feedback 26.

EXAMPLE EMBODIMENTS

In the following, two particular, concrete embodiments of the proposed in-network personalization system are described.

First Embodiment

An in-network personalized advertising system. In this case, the domain-dependent vocabulary consists of product-related keywords. Since the system maps network requests to sets of product-related keywords, the system will be used to automatically inject advertisements related to these keywords in mobile devices, by issuing additional requests from the network. This changes the behavior of the communication network on a per-user level and tailors advertisements to the current users based on their requests. A brokerage system that allows advertisers to bid on keywords can be used to connect the output of the proposed system to advertisements.

Second Embodiment

An in-network personalized quality of service system. In this case, the domain-dependent vocabulary consists of terms that are associated with particular user types (for instance, user who watches mostly videos, user who checks mostly e-mails, etc.). Since the proposed system maps users to their request behavior type, the network behavior can be changed according to the type of user identified. For instance, the network can have different caching strategies based on the type of users. Users who request frequent video content can be assigned more bandwidth. Users who use real-time applications such as navigation services can be assigned lower latency by placing the application's algorithm closer to the edge.

According to different embodiments, the system provides for the following features/advantages: A method that performs a separation of a continuous request sequence according to predefined sequence identifiers (SID) and request key values; buffering of fixed-size request sequences for each SID; and/or online learning of embedding model using the buffered fixed-size sequences, but only if a request key value has been used by a number of different users to ensure privacy.

In an embodiment, the present invention also provides a method for user personalization comprising the steps of:

pre-processing an incoming request sequence per predefined request key values;

separating the request sequence according to predefined sequence identifier (SID) and request key values;

buffering of per SID request sequences;

online learning of an embedding model from the buffered request sequences;

changing personalization and network characteristics based on queries to the embedding model; and updating the mapping in the Categorization component via a feedback loop.

Embodiments of the present invention are useable, for example, in a Traffic Management Solution product suite currently being marketed by NEC. More generally, the system can be integrated within any communication network system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A personalization system, comprising:
   a preprocessing component configured to receive a request from a user over a communications network and generate a request key using predefined attributes of the request;
   a categorization component configured to map the request key to a subset of domain-dependent vocabulary;
   an augmentation and buffer component configured to augment the request with the subset of domain-dependent vocabulary mapped to the request key by the categorization component and to buffer request sequences in queues according to sequence identifiers;
   an embedding model component configured to update an embedding model using the buffered request sequences; and
   a personalization component configured to provide a personalization using the updated embedding model.

2. The personalization system according to claim 1, wherein the embedding model component is configured to output a union of domain-dependent vocabulary associated with request key values of the buffered request sequences.

3. The personalization system according to claim 1, wherein the embedding model uses two distinct sets of tokens including a set of input tokens, which is a set of request key values visited at least a predetermined number of times by different users, and a set of output tokens, which comprises corresponding domain-dependent vocabulary.

4. The personalization system according to claim 1, further comprising a user interaction component configured to detect whether the personalization was utilized by the user and to provide feedback about the utilization for updating a table used by the categorization component for the mapping.

5. The personalization system according to claim 1, wherein the sequence identifiers each correspond to an individual user, and wherein the augmentation and buffer component includes a counter configured to count a number of the sequence identifiers which have made a request to the request key value.

6. The personalization system according to claim 5, wherein the augmentation and buffer component is configured to augment and buffer the requests only upon the counter reaching a predetermined threshold of the sequence identifiers which have made the request to the request key value so as to ensure privacy.

7. The personalization system according to claim 1, wherein the request sequences are buffered using one queue per sequence identifier, and wherein the augmentation and buffer component is configured to transfer the queues to the embedding model upon the queues having reached a predetermined, fixed length.

8. The personalization system according to claim 1, wherein the personalization is an advertisement.

9. A method for providing an in-network user personalization, the method comprising:
   generating a request key using predefined attributes of a request received from a user over a communications network;
   mapping the request key to a subset of domain-dependent vocabulary stored in a look-up table;
   augmenting the request with the subset of domain-dependent vocabulary mapped to the request key;
   buffering request sequences in queues according to sequence identifiers;
   updating an embedding model using the buffered request sequences; and
   providing the in-network user personalization to the user using the updated embedding model.

10. The method according to claim 9, wherein the embedding model uses two distinct sets of tokens including a set of input tokens, which is a set of request key values visited at least a predetermined number of times by different users, and a set of output tokens, which comprises corresponding domain-dependent vocabulary.

11. The method according to claim 9, further comprising detecting whether the personalization was utilized by the user, providing feedback about the utilization and updating the look-up table based on whether the personalization was utilized or not.

12. The method according to claim 9, wherein the sequence identifiers each correspond to an individual user, the method further comprising using a counter to count, for each request key value, a number of the sequence identifiers which have made a request to the request key value.

13. The method according to claim 12, wherein the request sequences are buffered until the counter reaches a predetermined threshold of the sequence identifiers which have made the request to the request key value so as to ensure privacy.

14. The method according to claim 9, wherein the request sequences are buffered using one queue per sequence identifier, and wherein the augmentation and buffer component is configured to transfer the queues to the embedding model upon the queues having reached a predetermined, fixed length.

15. A non-transitory, computer-readable medium having instructions thereon, which when executed on one or more processors causes the processors to perform a method comprising:
   generating a request key using predefined attributes of a request received from a user over a communications network;
   mapping the request key to a subset of domain-dependent vocabulary stored in a look-up table;
   augmenting the request with the subset of domain-dependent vocabulary mapped to the request key;
   buffering request sequences in queues according to sequence identifiers;
   updating an embedding model using the buffered request sequences; and
   providing a personalization to the user using the updated embedding model.

* * * * *